United States Patent
Choi et al.

(10) Patent No.: US 11,069,913 B2
(45) Date of Patent: Jul. 20, 2021

(54) REDOX FLOW BATTERY WITH POROUS ELECTRODE IN WHICH MIXING PLATE IS INSERTED

(71) Applicant: INDUSTRY-ACADEMIC COOPERATION FOUNDATION, YONSEI UNIVERSITY, Seoul (KR)

(72) Inventors: Jung Il Choi, Goyang (KR); Yun Young Choi, Goyang (KR); Min Gyu Yang, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 295 days.

(21) Appl. No.: 16/276,380

(22) Filed: Feb. 14, 2019

(65) Prior Publication Data

US 2020/0185748 A1 Jun. 11, 2020

(30) Foreign Application Priority Data

Dec. 5, 2018 (KR) .......................... 10-2018-0154913

(51) Int. Cl.
*H01M 8/18* (2006.01)
*H01M 8/04186* (2016.01)
*H01M 8/02* (2016.01)

(52) U.S. Cl.
CPC ............. *H01M 8/188* (2013.01); *H01M 8/02* (2013.01); *H01M 8/04186* (2013.01)

(58) Field of Classification Search
CPC .... H01M 8/02; H01M 8/04186; H01M 8/188; H01M 8/18
See application file for complete search history.

(56) References Cited

U.S. PATENT DOCUMENTS

| 2015/0030954 A1* | 1/2015 | Kim | H01M 4/8605 |
| | | | 429/452 |
| 2015/0263358 A1* | 9/2015 | Zaffou | H01M 8/0263 |
| | | | 429/51 |
| 2018/0159163 A1* | 6/2018 | Hanafusa | H01M 4/86 |

FOREIGN PATENT DOCUMENTS

| JP | 2003157885 A | 5/2003 | |
| JP | 2016065286 | 4/2016 | |
| JP | 6008224 | 10/2016 | |
| JP | 20180036391 A | 4/2018 | |
| JP | 2018186014 A | 11/2018 | |
| KR | 20110088881 | 8/2011 | |
| WO | WO-2016189970 A1 * | 12/2016 | .............. H01M 4/86 |

* cited by examiner

*Primary Examiner* — Adam A Arciero

(57) ABSTRACT

The present exemplary embodiments disclose a redox flow battery. The present exemplary embodiments disclose a redox flow battery which forms a mixing space for mixing an active material in a porous electrode to improve a ununiform concentration of the active material, thereby improving an energy efficiency by reducing an over-potential and increasing an area of the stack and an output thereof.

11 Claims, 21 Drawing Sheets

FIG. 6

|  | NORMAL ELECTRODE | DIFFUSER ELECTRODE |  | NORMAL ELECTRODE | DIFFUSER ELECTRODE |
|---|---|---|---|---|---|
| Cell voltage(V) SOC = 0.1 | 1.2627 | 1.2624 | Overpotential(V) SOC = 0.1 | 0.11744 | 0.11714 |
| Cell voltage(V) SOC = 0.5 | 1.3665 | 1.3663 | Overpotential(V) SOC = 0.5 | 0.1065 | 0.1063 |
| Cell voltage(V) SOC = 0.9 | 1.5167 | 1.5127 | Overpotential(V) SOC = 0.9 | 0.141959 | 0.137959 |

REDOX FLOW BATTERY WITH POROUS ELECTRODE IN WHICH MIXING PLATE IS INSERTED

CROSS-REFERENCE TO RELATED APPLICATIONS

This application claims priority to and the benefit of Korean Patent Application No. 10-2018-0154913 filed in the Korean Intellectual Property Office on Dec. 5, 2018, the entire contents of which are incorporated herein by reference.

TECHNICAL FIELD

A technical field of the present invention relates to a redox flow battery. This study relates to development of an asymmetric composite bipolar electrode and stack technology in which a flow channel for a zinc-brome flow battery of ESS technology development business supported by Ministry of Trade, Industry, and Energy is introduced (No. 20172420108640). This study relates to development of a 1 kW level of low price Fe/Cr redox flow battery stack and development of a core technology for improvement of energy efficiency of the Energy technology development business supported by Ministry of Trade, Industry, and Energy (No. 20162020107060).

BACKGROUND ART

The contents described in this section merely provide background information on the present exemplary embodiment but do not constitute the related art.

A redox flow secondary battery is one of energy storage system (ESS) technologies and has a structure in which a battery stack (output) and an electrolyte tank (capacity) are separated. Therefore, the output may be adjusted by increasing a size of a unit cell or controlling the number of cells laminated in the stack. Alternatively, the tank capacity may be expanded.

In the redox flow secondary battery, a parameter related to an energy density includes a size of the cell and an operating current density and a parameter related to a system efficiency includes pressure drop and a concentration of an active material in an electrode.

A redox flow secondary battery of the related art forms a flow channel structure on an electrode by introducing a bipolar plate to an electrode. The redox flow secondary battery of the related art causes the electrolyte to flow into a porous electrode and designs an inlet flow channel of the electrode to have various shapes to uniformize a flow rate of the electrolyte entering the inlet of the electrode.

SUMMARY OF THE INVENTION

A major object to be achieved by the exemplary embodiments of the present disclosure is to form a mixing space for mixing active materials in a porous electrode to improve a ununiform concentration of active materials.

Other and further objects of the present disclosure which are not specifically described can be further considered within the scope easily deduced from the following detailed description and the effect.

According to an aspect of the present exemplary embodiment, the present disclosure provides a redox flow battery including an ion exchange membrane and an electrode unit which includes a first flow electrode and a second flow electrode separated by the ion exchange membrane, and flows an electrolyte therein or thereout through the first flow electrode and the second flow electrode in which an active material included in the electrolyte causes oxidation and reduction reactions and the electrode unit forms a mixing space which mixes the active material in a path through which the active material moves.

The first flow electrode and the second flow electrode are implemented by porous media and the mixing spaces are formed in the first flow electrode and the second flow electrode, respectively, to reduce a concentration deviation of the active material.

The mixing space may be an empty space formed when the first flow electrode and/or the second flow electrode are divided into plural and are disposed to be spaced apart from each other and may be formed between the plurality of first flow electrodes and/or second flow electrodes.

The first flow electrode and/or the second flow electrode may be divided into plural and disposed to be spaced apart from each other, the mixing space may be implemented by a porous medium and formed between the plurality of first flow electrodes and/or second flow electrodes and a porosity or a permeability of the mixing space may be higher than a porosity of a permeability of the first flow electrode and/or the second flow electrode.

The mixing space may be longitudinally installed in a direction perpendicular to a moving direction of the active material and a thickness and a width of the mixing space may be smaller than or equal to a thickness and a width of the first flow electrode and the second flow electrode.

The mixing space may be longitudinally installed at a predetermined angle with respect to the moving direction of the active material and a thickness and a width of the mixing space may be smaller than or equal to a thickness and a width of the first flow electrode and the second flow electrode.

A width of the mixing space may become narrower from the outside to the center.

The electrode unit may include a wall protruding to a direction perpendicular to the moving direction of the active material and a side of the mixing space is recessed along a shape of the wall.

A side of the mixing space may be recessed to have a triangular shape, a triangular serrated shape, a trapezoidal shape, a semicircular shape, or a combination thereof.

A positive electrode may be located outside the first flow electrode and a negative electrode may be located outside the second flow electrode.

Two tanks which store a positive electrolyte flowing in the first flow electrode and a negative electrolyte flowing in the second flow electrode, respectively, may be included.

Two pumps which circulate the positive electrolyte and the negative electrolyte, respectively, may be included.

As described above, according to the exemplary embodiments of the present disclosure, a mixing space for mixing active materials in a porous electrode is formed to improve ununiformity of a concentration of the active material, thereby reducing over-potential to improve energy efficiency and increasing a size and an output of the stack.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIGS. 6, 7A to 7C illustrate a result of a simulation performed according to exemplary embodiments of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

Figure 1A:
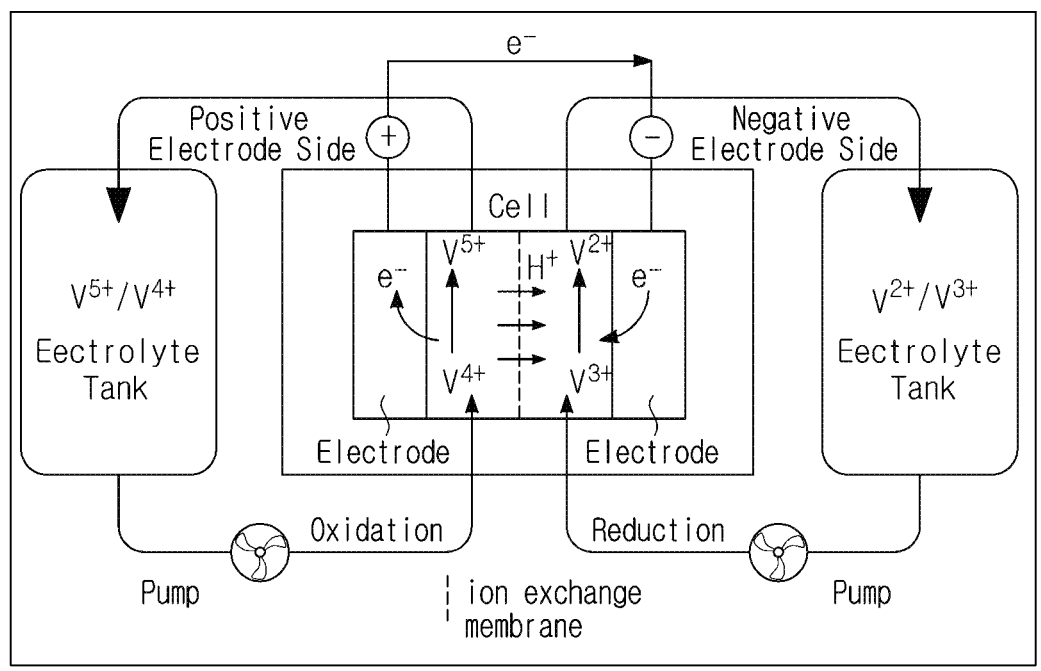
FIGS. 1A to 1C are conceptual views for explaining an operation principle of a redox flow battery.
Figure 1B:
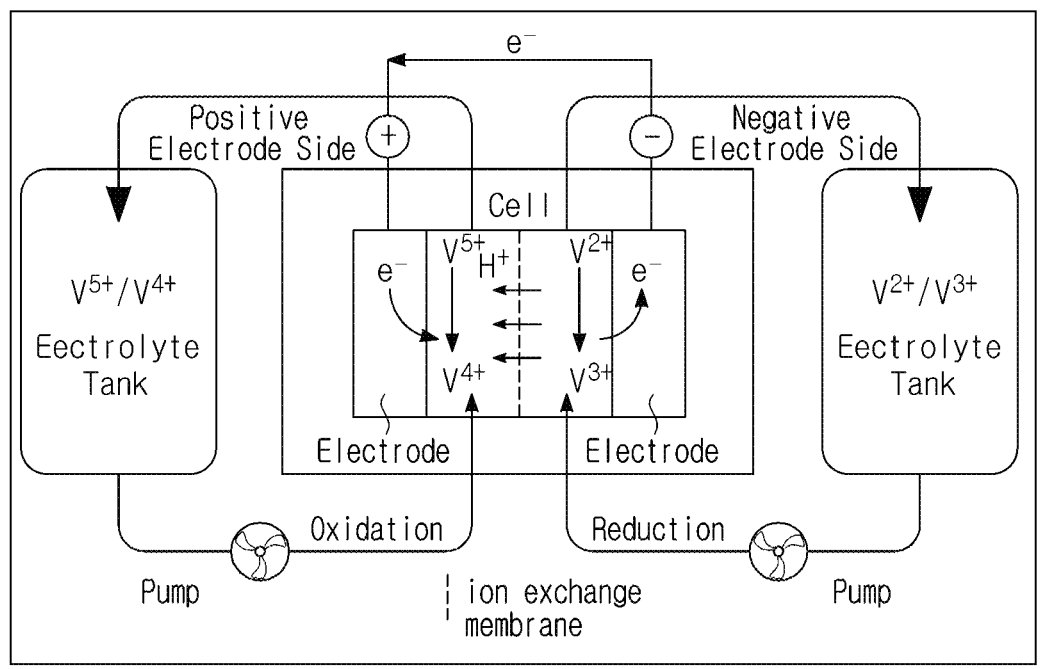
Figure 1C:
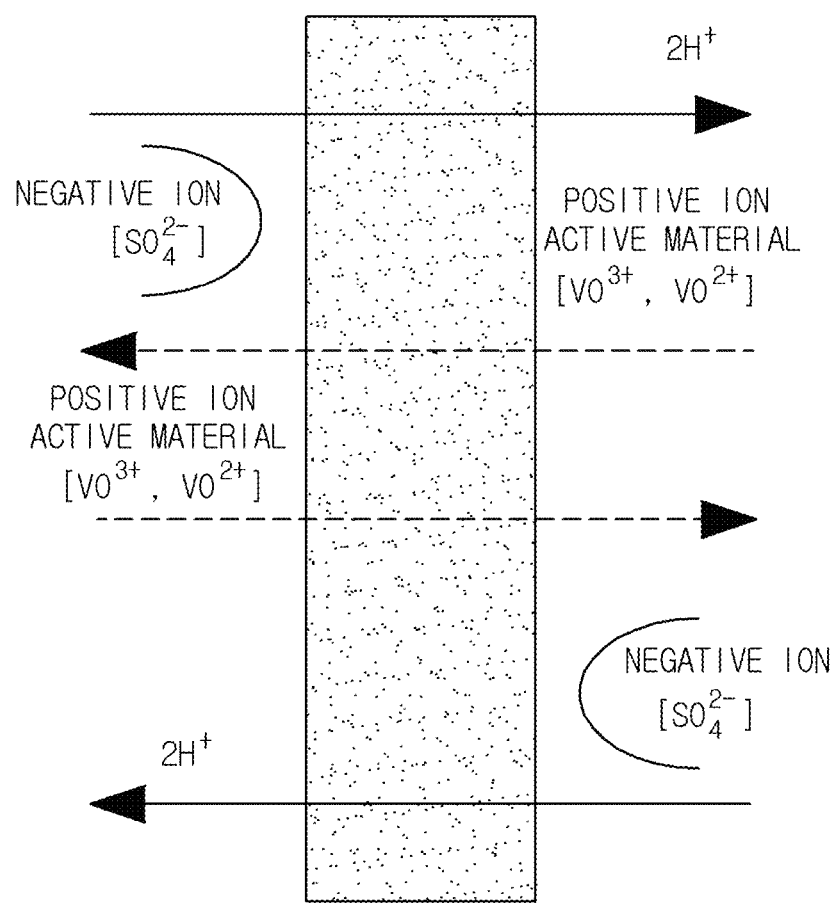

FIGS. 1A to 1C are conceptual views for explaining an operation principle of a redox flow battery.

Referring to FIGS. 1A and 1B, according to a basic structure of a redox flow battery RFB, a battery stack (output) and an electrolyte tank (capacity) are separable. The redox flow battery includes a tank in which active materials having different oxidation states are stored, a pump which circulates active material at the time of charging/discharging, and a cell which is divided by an ion exchange membrane. As the active material, an electrolyte prepared by dissolving a transition metal such as V, Fe, Cr, Cu, Ti, Mn, and Sn in a strong acid aqueous solution is used. The prepared electrolyte is not stored in the cell, but is stored in a liquid state in an external tank and supplied into the cell through the pump during the charging/discharging process. Further, the electrode used in the stack is an inactive electrode so that the electrode reacts between a surface of the electrode and the electrolyte without having a chemical reaction. A major redox couple includes Fe/Cr, V/V, V/Br, Zn/Br, and Zn/Ce. Referring to FIG. 1C, as the electrode, a solution obtained by dissolving 2M $VOSO_4$ in 3M $H_2SO_4$ is generally used and an oxidation number of a vanadium ion in this case is +4.

A plurality of battery cells is configured in the stack. The battery cell includes a membrane serving as an ion exchange membrane, first and second porous electrodes disposed with the membrane therebetween, first and second flow frames fixing the first and second porous electrodes at edges of the first and second porous electrodes, respectively, and positive and negative electrodes located at outsides of the first and second porous electrodes, respectively.

The first and second porous electrodes may be prepared by carbon felt and the positive and negative electrodes may be prepared by graphite. The first and second flow frames include a plurality of holes to circulate the electrolyte.

In the first flow frame, one of the plurality of holes is a positive electrolyte inlet, another is a positive electrolyte outlet, and the remaining two holes are negative electrolyte through-holes. In the first flow frame, flow channels are formed between the positive electrolyte inlet and the first porous electrode and between the first porous electrode and the positive electrolyte outlet so that the positive electrolyte flows through the first porous electrode.

In the second flow frame, one of the plurality of holes is a negative electrolyte inlet, another is a negative electrolyte outlet, and the remaining two holes are positive electrode through-holes. In the second flow frame, flow channels are formed between the negative electrolyte inlet and the second porous electrode and between the second porous electrode and the negative electrolyte outlet so that the negative electrolyte flows through the second porous electrode.

Two types of redox couples (Zn/Br or V/V) having different oxidation numbers included in the positive and negative electrolytes react in the first and second porous electrodes to perform charging/discharging. The charging is performed by the oxidation reaction and the discharging is performed by the reduction reaction.

The ion exchange membrane applicable to the RFB needs to have characteristics such as a high ion selective permeability, a low electrical resistance, a small diffusion coefficient for solutes and solvents, and a chemical stability and Nafion and CMV, AMV, DMV (Asahi glass) films are widely used. A film obtained by bonding a conductive polymer such as polyaniline or polypyrrole to a microporous PVC separator, a ultra-microporous filter membrane, CMV, or AMV, a film obtained by crosslinking silica-filled PE, sulphonated polysulphone film, PE symmetric membrane, and asymmetric membrane with an electron beam are applicable.

Figure 2A:
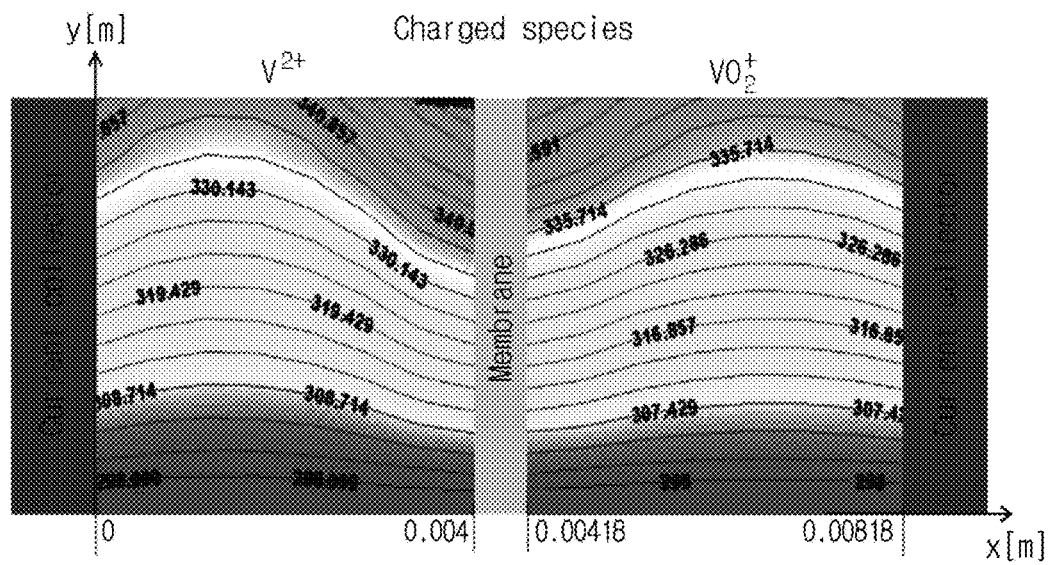
FIG. 2A is a view illustrating a distribution of a concentration of reactants in an electrode of a unit cell when a redox flow battery is charged and FIGS. 2B and 2C are views illustrating an electrode structure to which a redox flow battery is applicable.

FIG. 2A is a view illustrating a distribution of a concentration of reactants in an electrode of a unit cell when a redox flow battery is charged. FIG. 2A is a view illustrated in Three-dimensional transient, nonisothermal model of all-vanadium redox flow batteries, energy, 81 on 2015 by Oh et al. (pages 3 to 14).

In the redox flow battery of the related art, when the electrolyte is transmitted to the cell (a reactive electrode) through a manifold from the external tank, a flow rate distribution and a concentration distribution of the electrolyte in the electrode affect the overvoltage and ununiform distribution causes voltage loss and side reactions. However, even though the flow rate and the concentration are uniform at the inlet of the electrode, the overvoltage and the ununiform concentration in the electrode generated as the reaction is performed in the electrode are not solved.

In the cell structure, the reaction occurs while flow proceeds from the inlet to the outlet. Since a main flow direction and a current direction are perpendicular to each other, the concentration deviation of the active material inevitably occurs also in the direction other than the main flow direction. Even though a material having a high diffusion coefficient is used, a diffusion degree is reduced in the porous medium by Bruggeman correction expressed by Equation 1.

$$D_i^{eff} = \varepsilon^{3/2} D_i \qquad \text{[Equation 1]}$$

D is a diffusion coefficient and c is a porosity having a value of 0 to 1. That is, in the redox flow battery of the related art, the porosity is reduced to increase a reaction area. However, in this case, there is a problem in that the diffusion coefficient in the porous electrode is reduced in accordance with the reduction of the porosity. When the area is increased and the current density is increased, the concentration deviation in the porous electrode becomes severe.

In the exemplary embodiment, a mixing plate is inserted into the porous electrode which flows from the inlet to the outlet to divide the porous electrode and the ununiform concentration in the area of the mixing plate is improved.

Figure 2B:
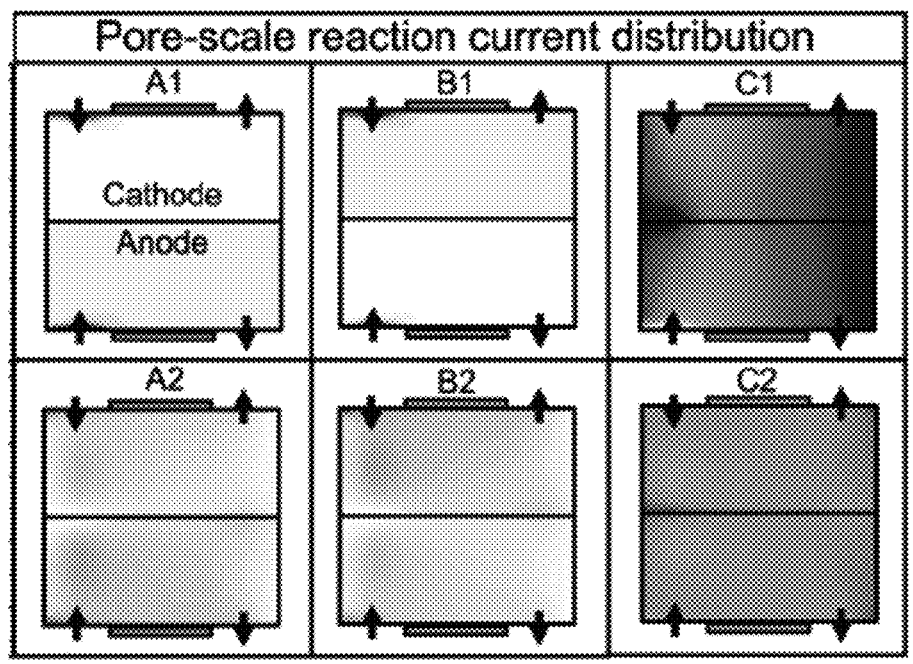
Figure 2C:
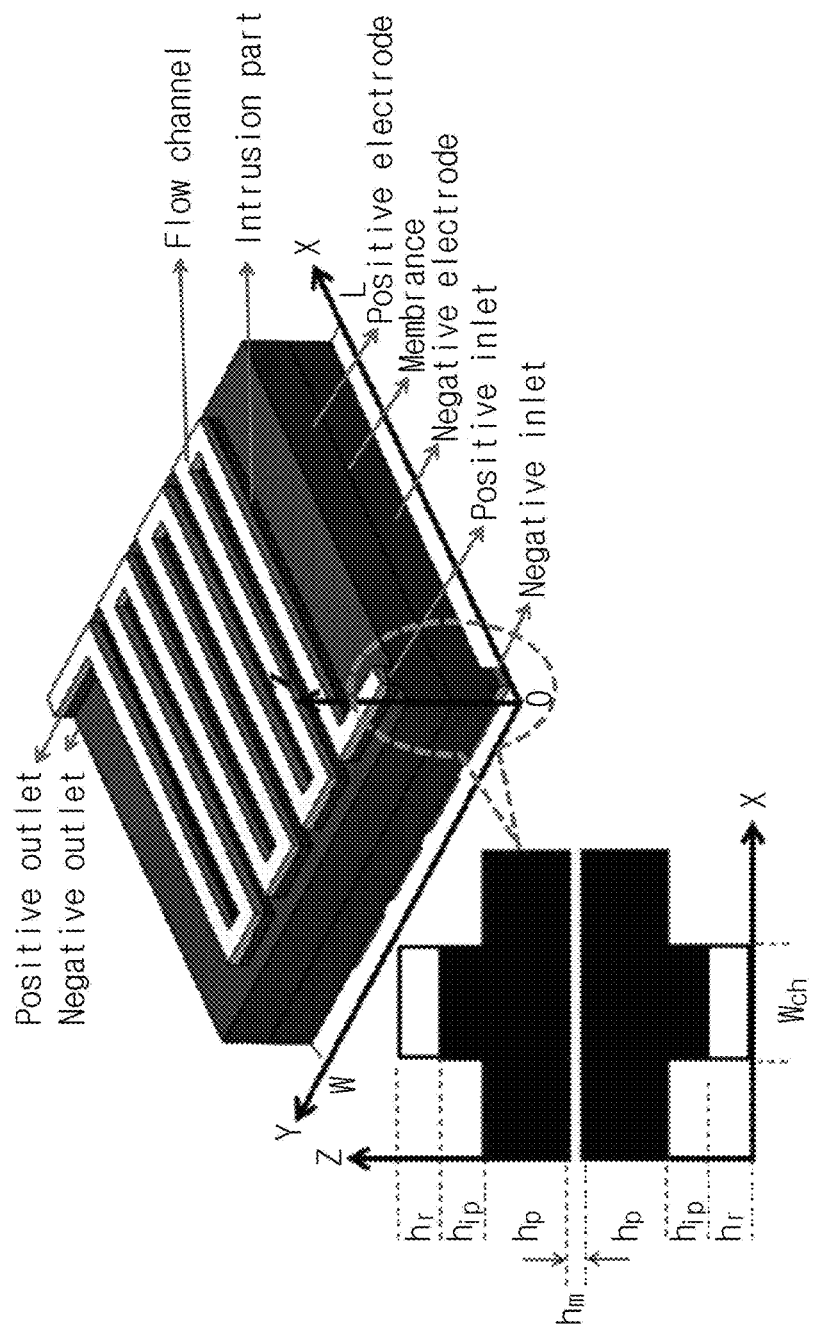

FIGS. 2B and 2C are views illustrating an electrode structure to which a redox flow battery is applicable. FIG. 2B is a view illustrated in Uncovering the role of flow rate in redox-active polymer flow batteries; simulation of reaction distributions with simultaneous mixing in tanks (on 2017, Electrochimica Acta, by Nemani et al.) and FIG. 2C is a view illustrated in Numerical study on vanadium redox flow battery performance with nonuniformly compressed electrode and serpentine flow field (on 2018, Applied energy, by Wang et al.).

Generally, when the redox flow battery is manufactured, the electrolyte solution may be supplied to one entire cross-section of the electrode and as illustrated in FIGS. 2B and 2C, the electrolyte solution may be partially provided. When the electrolyte solution is provided to a part of the electrode, the ununiformity of the electrolyte concentration in the electrode is increased, so that the effect of the redox flow battery according to the exemplary embodiment may be enhanced.

FIGS. 3A to 3D are views illustrating a structure of a redox flow battery. The redox flow battery includes an ion exchange membrane 100 and an electrode unit 200. A positive electrode is located outside the first flow electrode and a negative electrode is located outside the second flow electrode. The redox flow battery may include two tanks which store a positive electrolyte flowing in the first flow electrode and a negative electrolyte flowing in a second flow electrode. The redox flow battery may include two pumps which circulate the positive electrolyte and the negative electrolyte.

The electrode unit 200 include a first flow electrode 210 and a second flow electrode 220 separated by the ion exchange membrane 100. The electrolyte flows in or out through the first flow electrode 210 and the second flow electrode 220. The active material included in the electrolyte flowing in the electrode unit causes the oxidation or reduction reaction to charge/discharge the battery.

The first flow electrode 210 and the second flow electrode 220 are implemented by porous media.

The electrode unit 200 forms mixing spaces in a path through which the active materials move to mix the active materials. Mixing spaces 310 and 320 are formed in the first flow electrode 210 and the second flow electrode 220, respectively to reduce the concentration deviation of the active materials.

The mixing spaces 310 and 320 are empty spaces formed as the first flow electrode 210 and/or second flow electrodes 220 are divided into plural and are disposed to be spaced apart from each other. The first mixing space 310 may be formed between the plurality of first flow electrodes. The second mixing space 320 may be formed between the plurality of second flow electrodes.

The mixing spaces 310 and 320 may be implemented by porous media. The mixing spaces 310 and 320 are formed between the plurality of first flow electrodes 210 and/or second flow electrodes 220 and a porosity or permeability of the mixing space is higher than a porosity or permeability of the first flow electrode 210 and/or the second flow electrode 220.

Figure 3A:
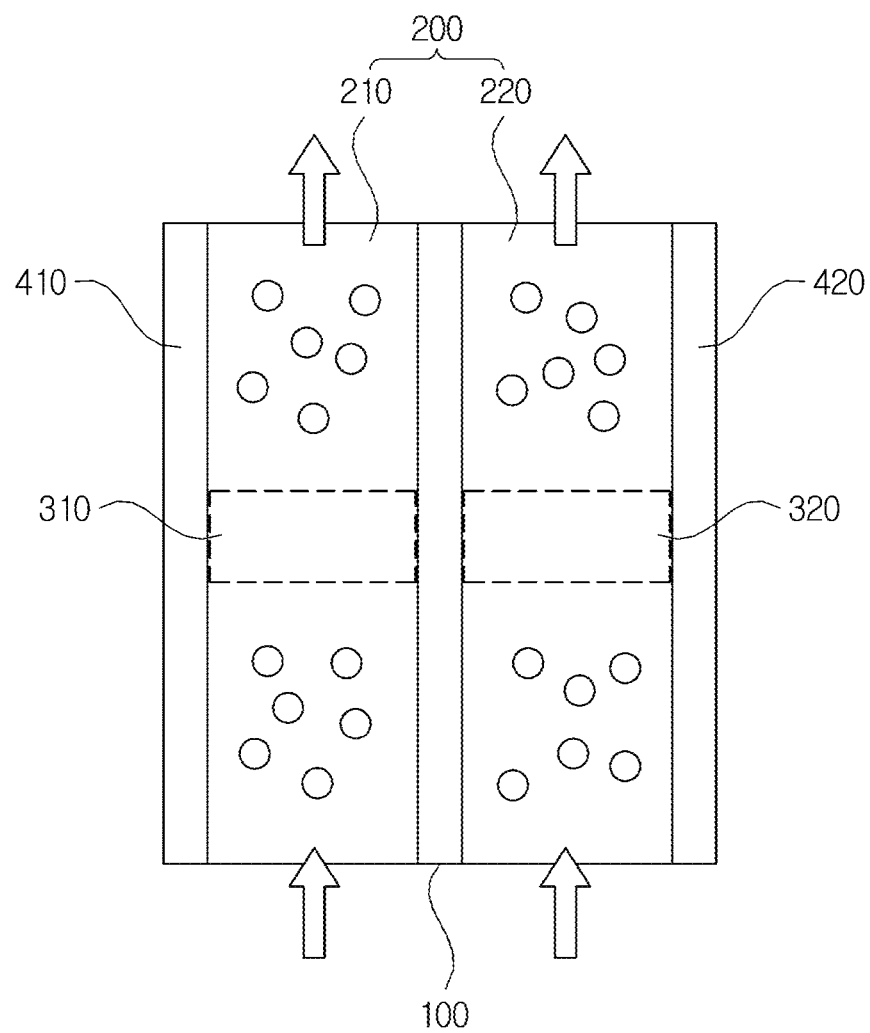
FIGS. 3A to 3D are views illustrating a structure of a redox flow battery according to exemplary embodiments of the present disclosure.
Figure 3B:
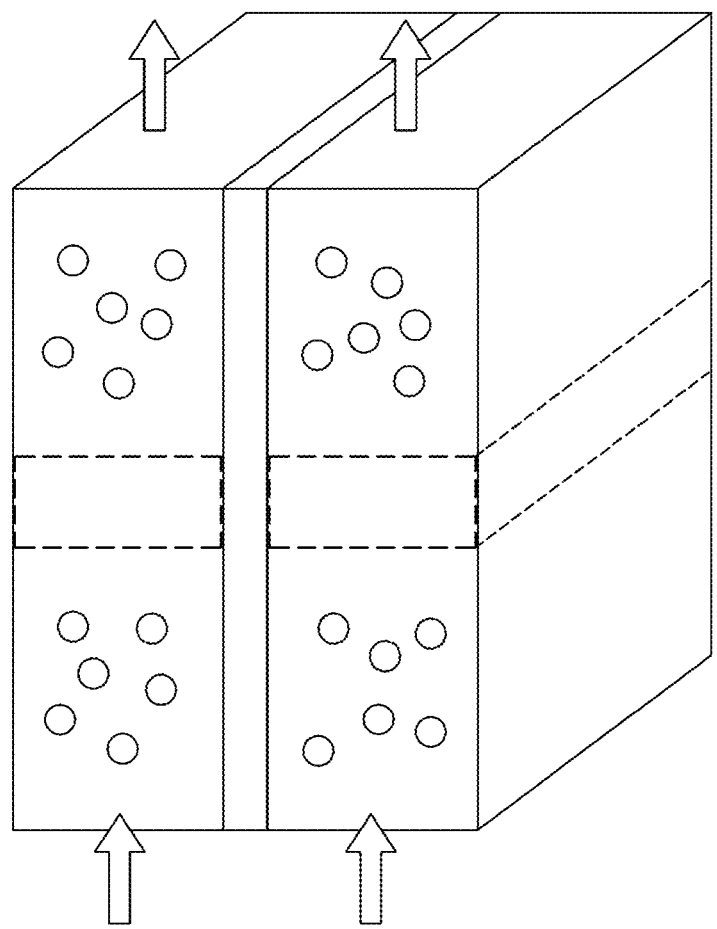

Referring to FIG. 3B, the mixing space may be longitudinally formed in a direction perpendicular to a moving direction of the active materials. A thickness and a width of the mixing space may be smaller than or equal to a thickness and a width of the first flow electrode and the second flow electrode.

Figure 3C:
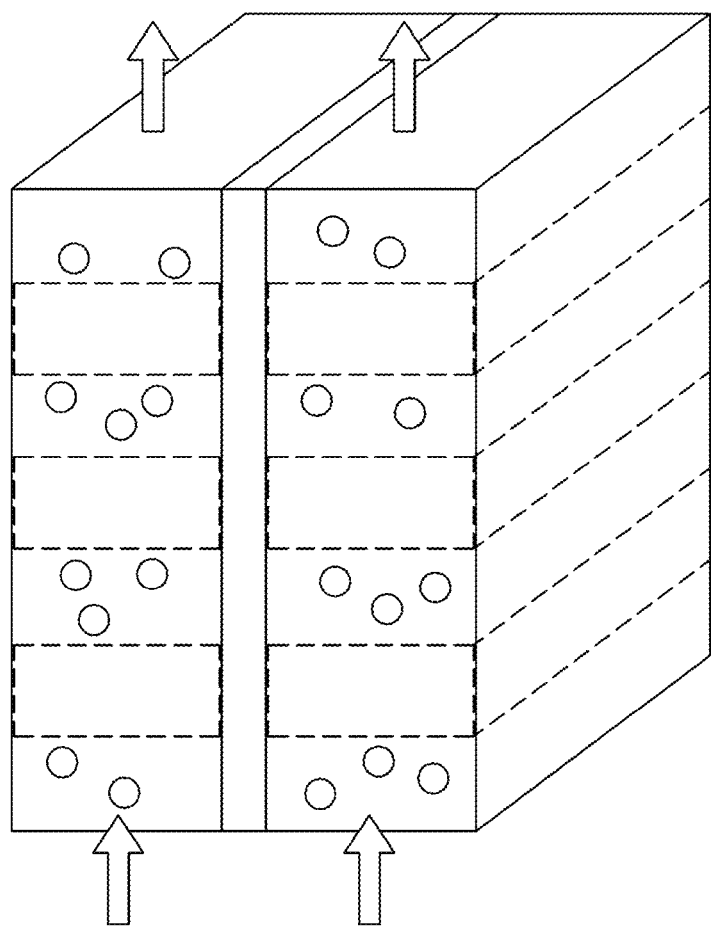

Referring to FIG. 3C, the redox flow battery may be formed to have a structure in which a plurality of mixing plates is formed in parallel.

Figure 3D:
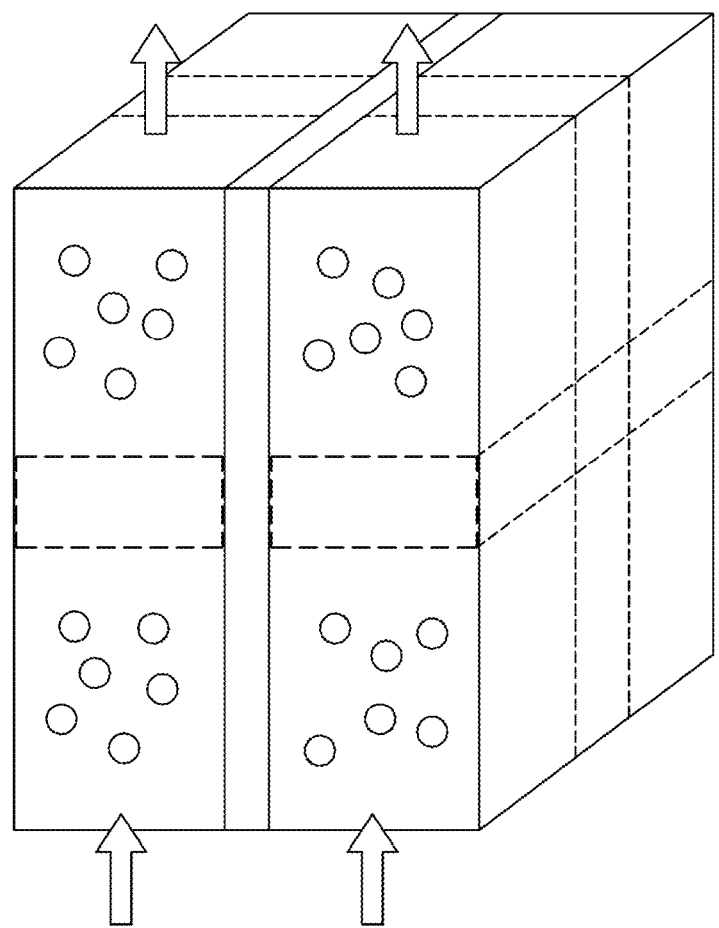

Referring to FIG. 3D, a concept of the mixing plate may expand to a three-dimensional structure. The mixing space may be longitudinally installed at a predetermined angle with respect to the moving direction of the active materials. The ununiform concentration inevitably caused by the increase of the size of the cell is solved and occurrence of the overvoltage and the side reaction may be minimized.

FIGS. 4A to 4D are views illustrating a cross-section of a porous electrode of a redox flow battery.

Figure 4A:
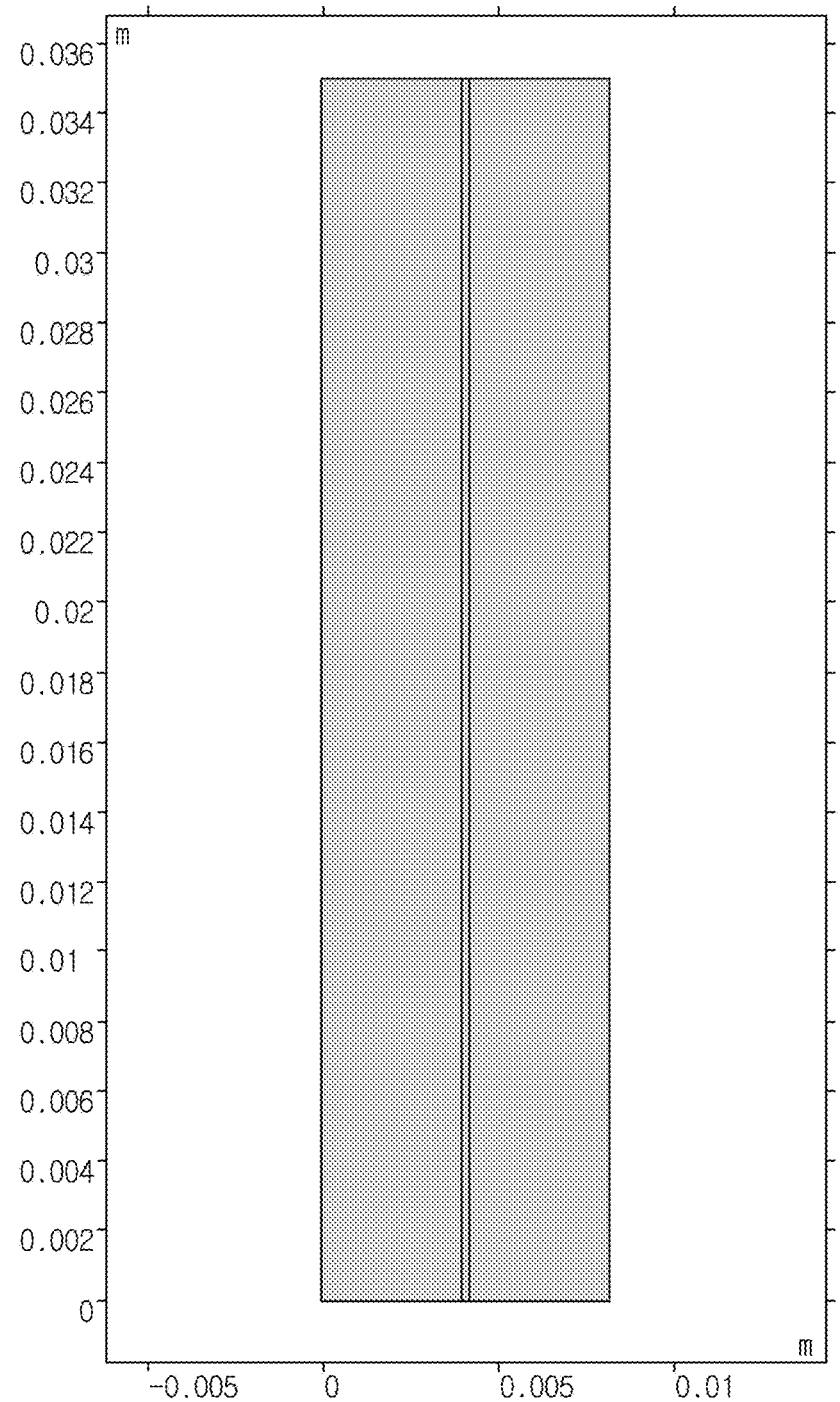
FIGS. 4A to 4D are views illustrating a cross-section of a porous electrode of a redox flow battery according to exemplary embodiments of the present disclosure.
Figure 4B:
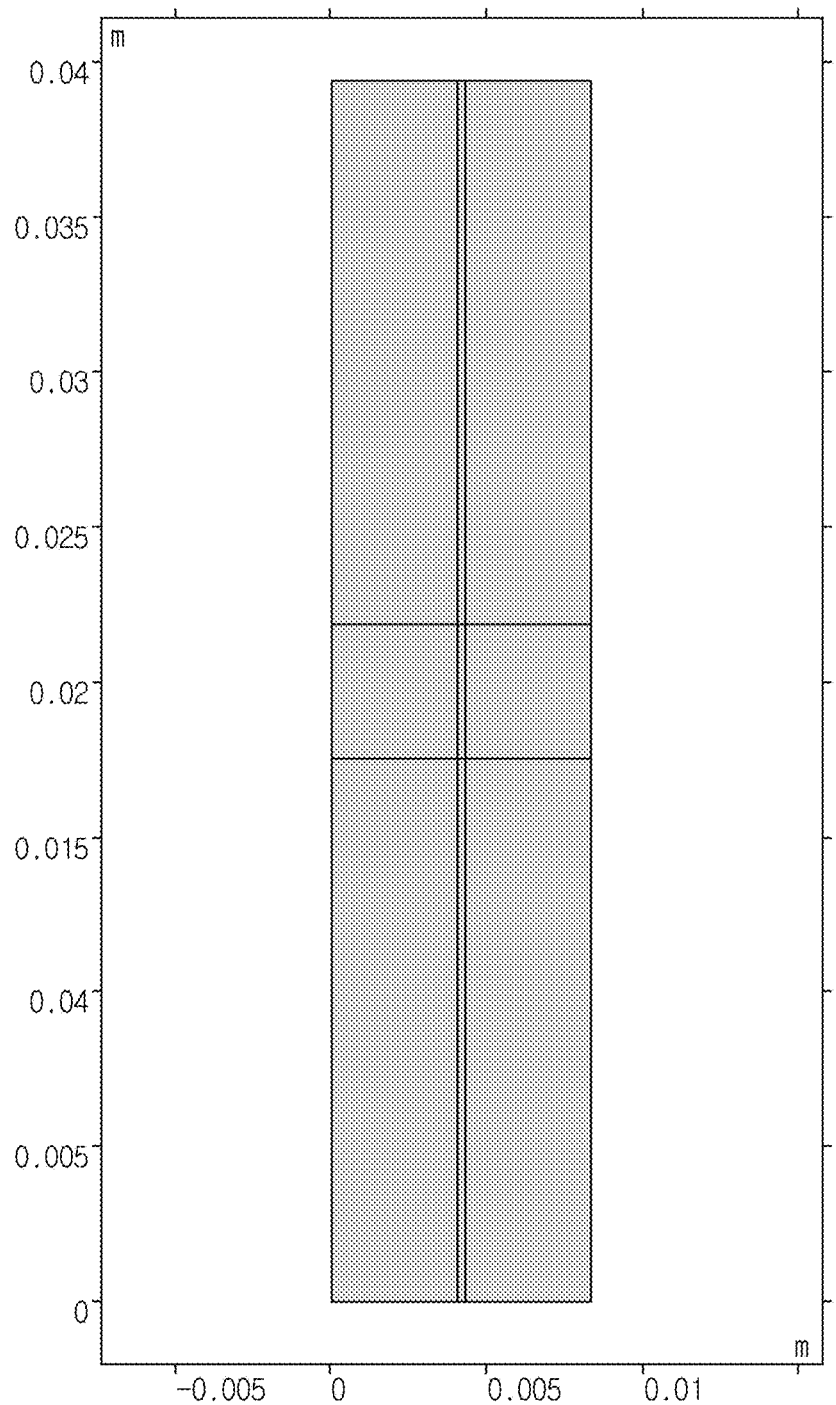
Figure 4C:
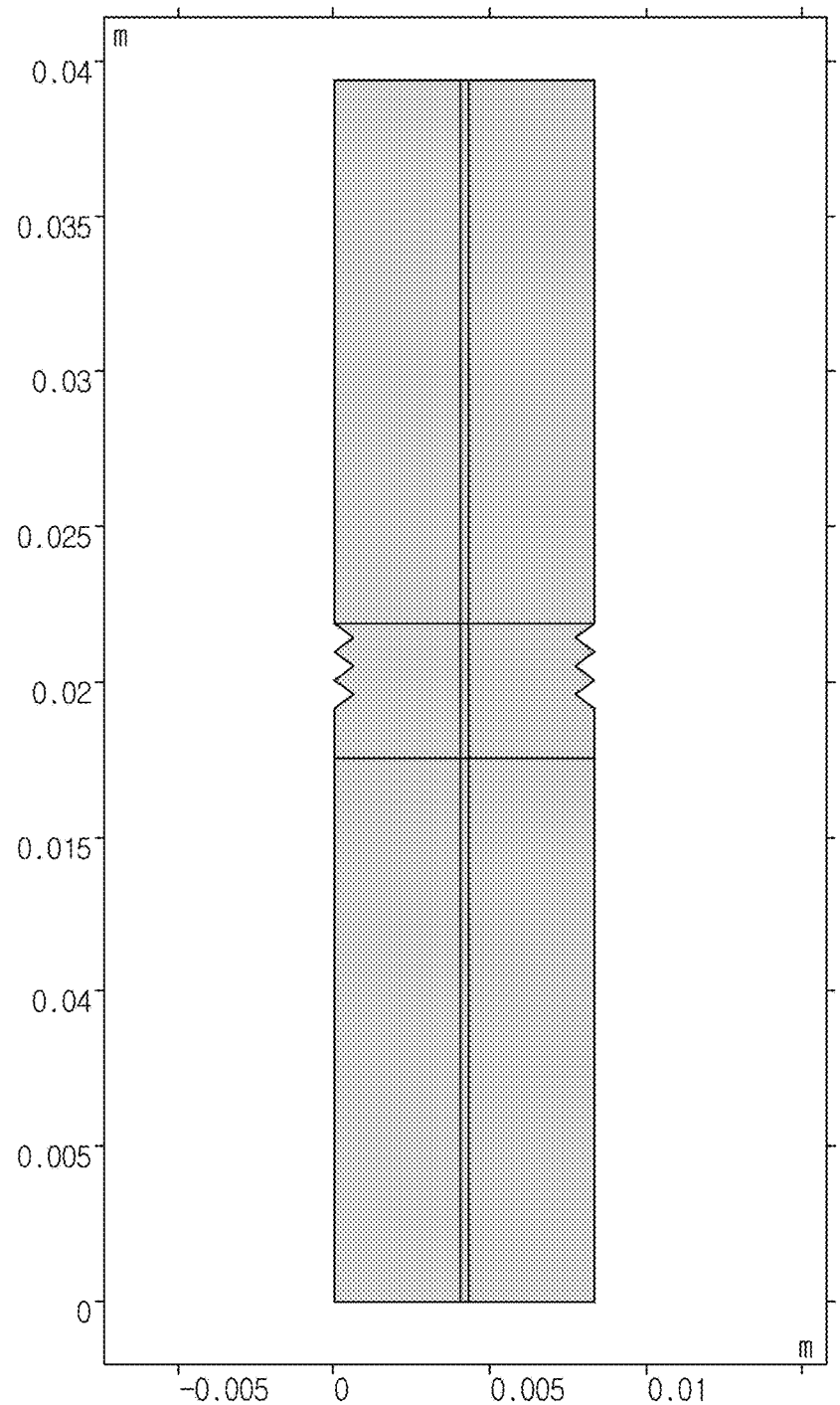
Figure 4D:
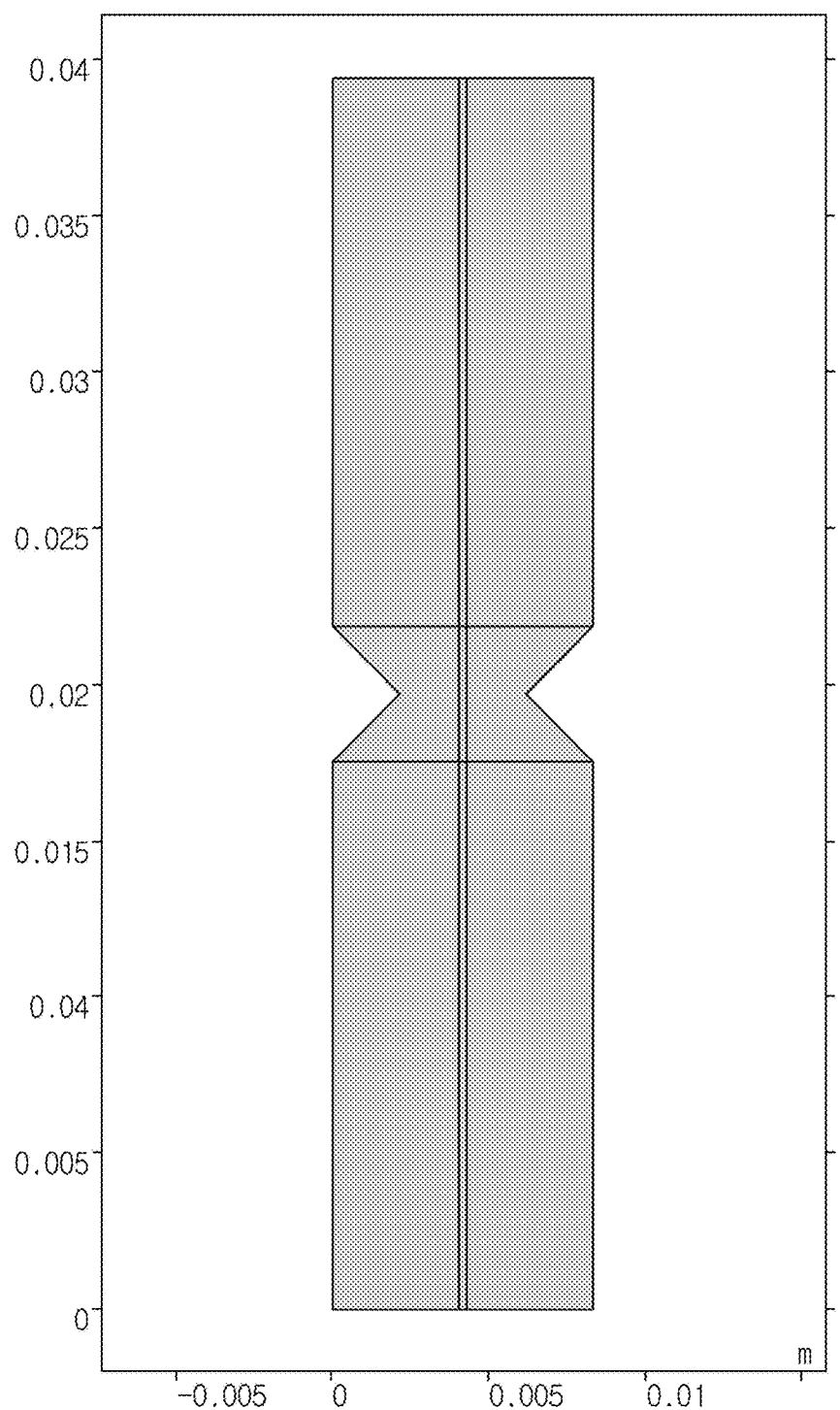

FIG. 4A illustrates a cross-section of a normal porous electrode and FIG. 4B is a cross-section of a porous electrode having a mixing plate or a mixing space formed in the middle of a channel. Referring to FIGS. 4C and 4D, a width of the mixing plate or the mixing space has a shape which becomes narrow from the outside to the center.

The electrode unit may include a wall protruding in a direction perpendicular to the moving direction of the active material and a side of the mixing plate or the mixing space is recessed along a shape of the wall. The side of the mixing space may be recessed to have a triangular shape, a triangular serrated shape, a trapezoidal shape, a semicircular shape, or a combination thereof.

FIGS. 5A to 5D are views illustrating a distribution of a concentration of a reactant in a porous electrode of a redox flow battery.

Figure 5A:
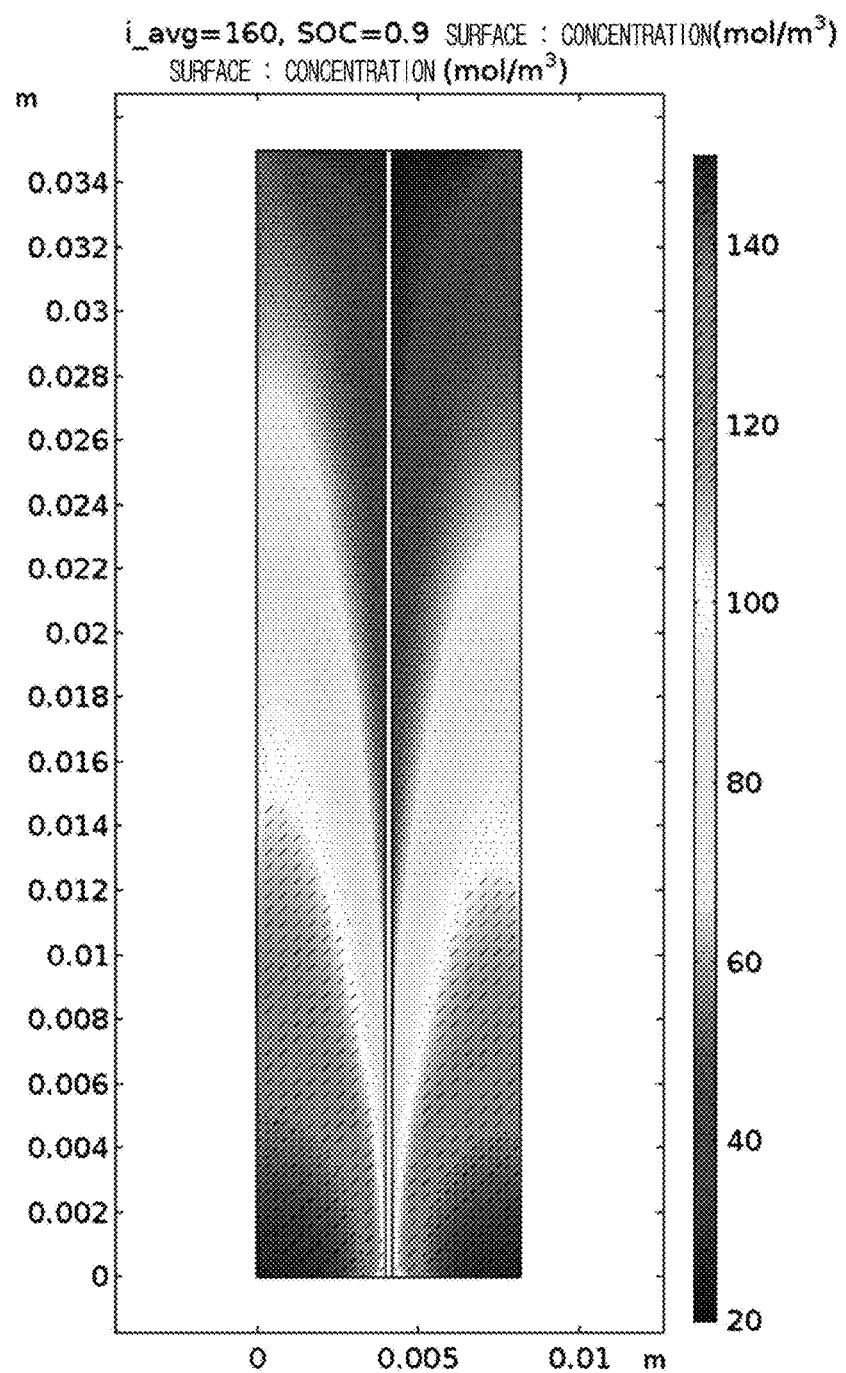
FIGS. 5A to 5D are views illustrating a distribution of a concentration of a reactant in a porous electrode of a redox flow battery according to exemplary embodiments of the present disclosure.
Figure 5B:
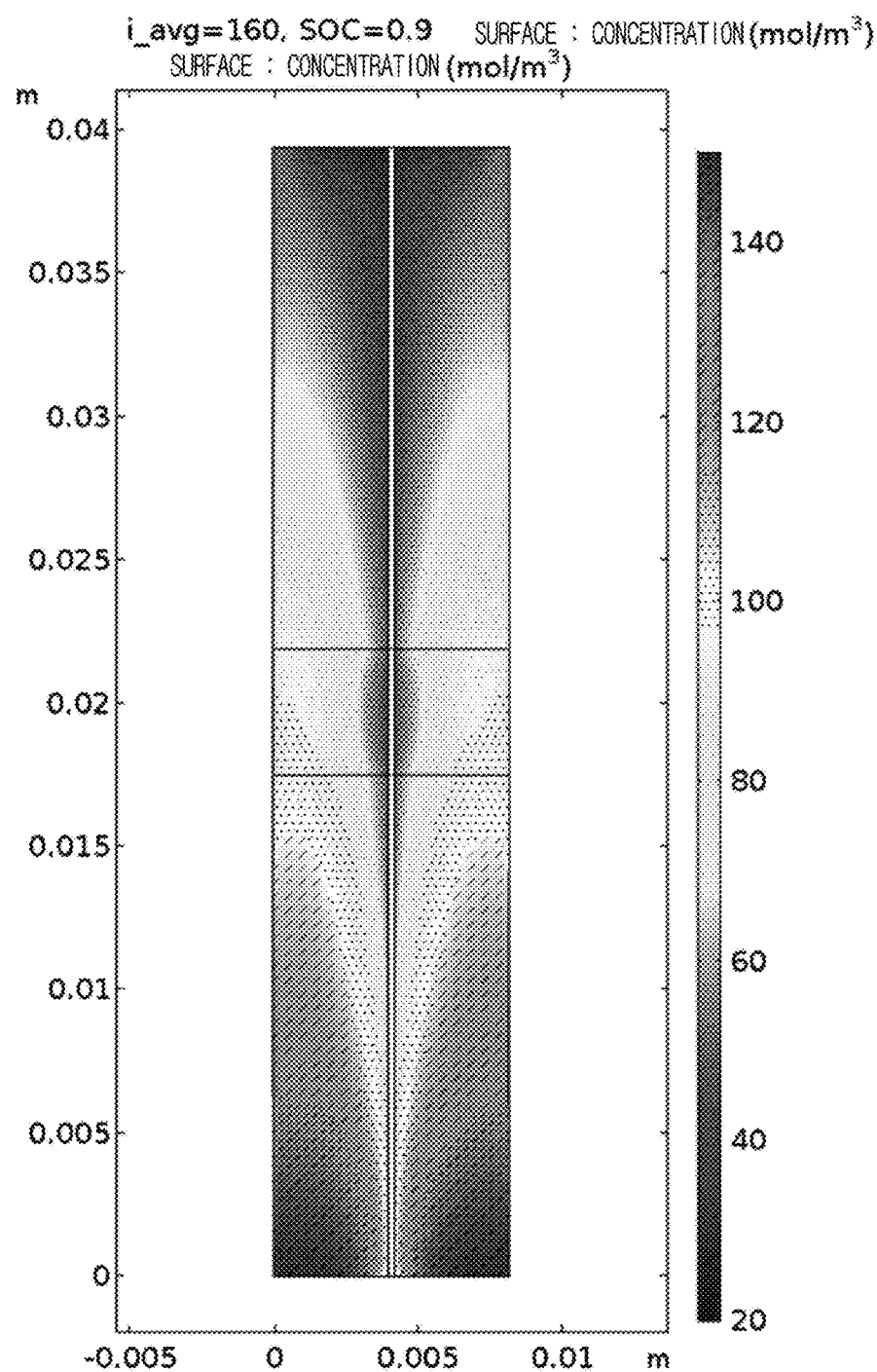
Figure 5C:
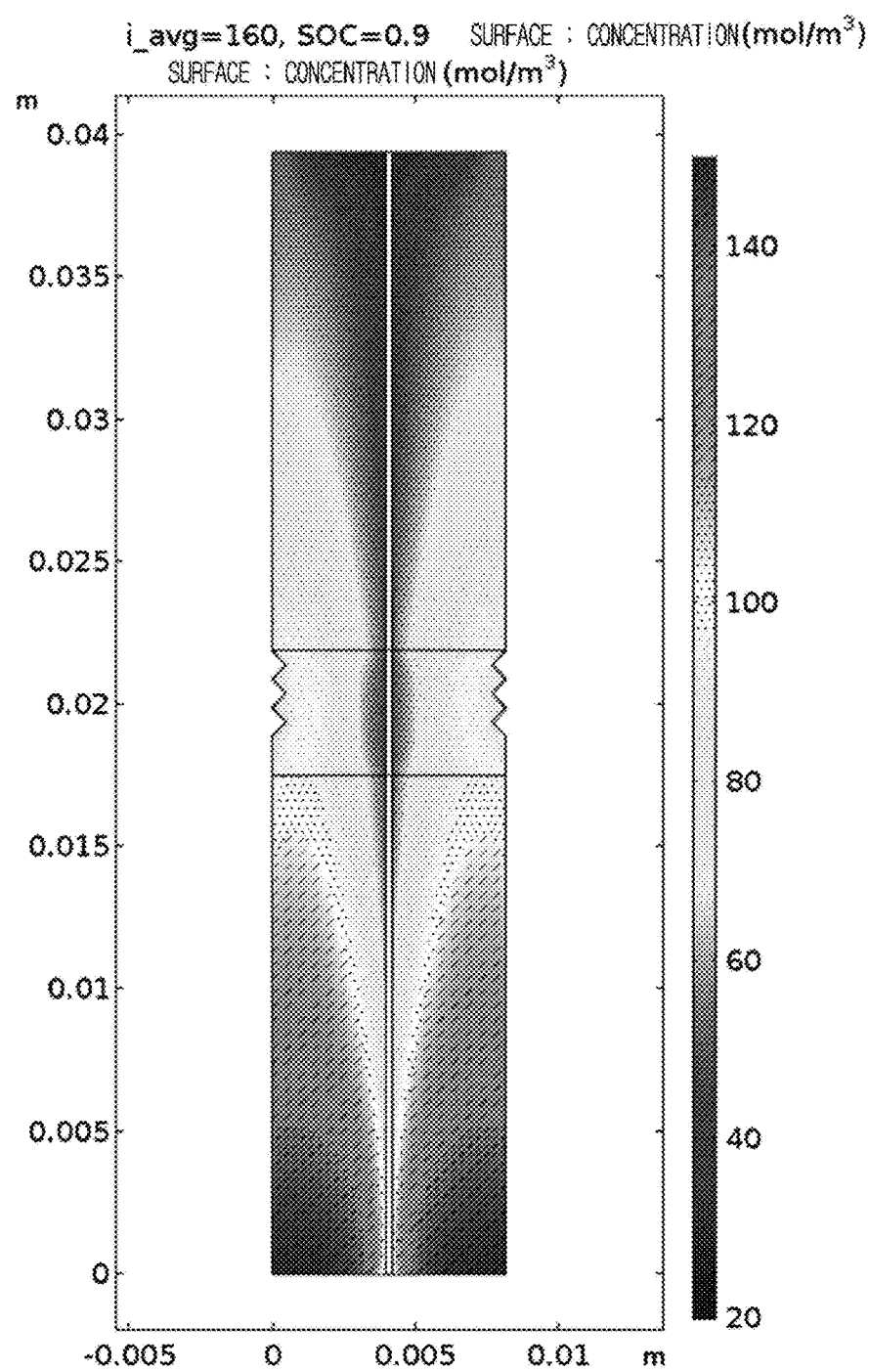
Figure 5D:
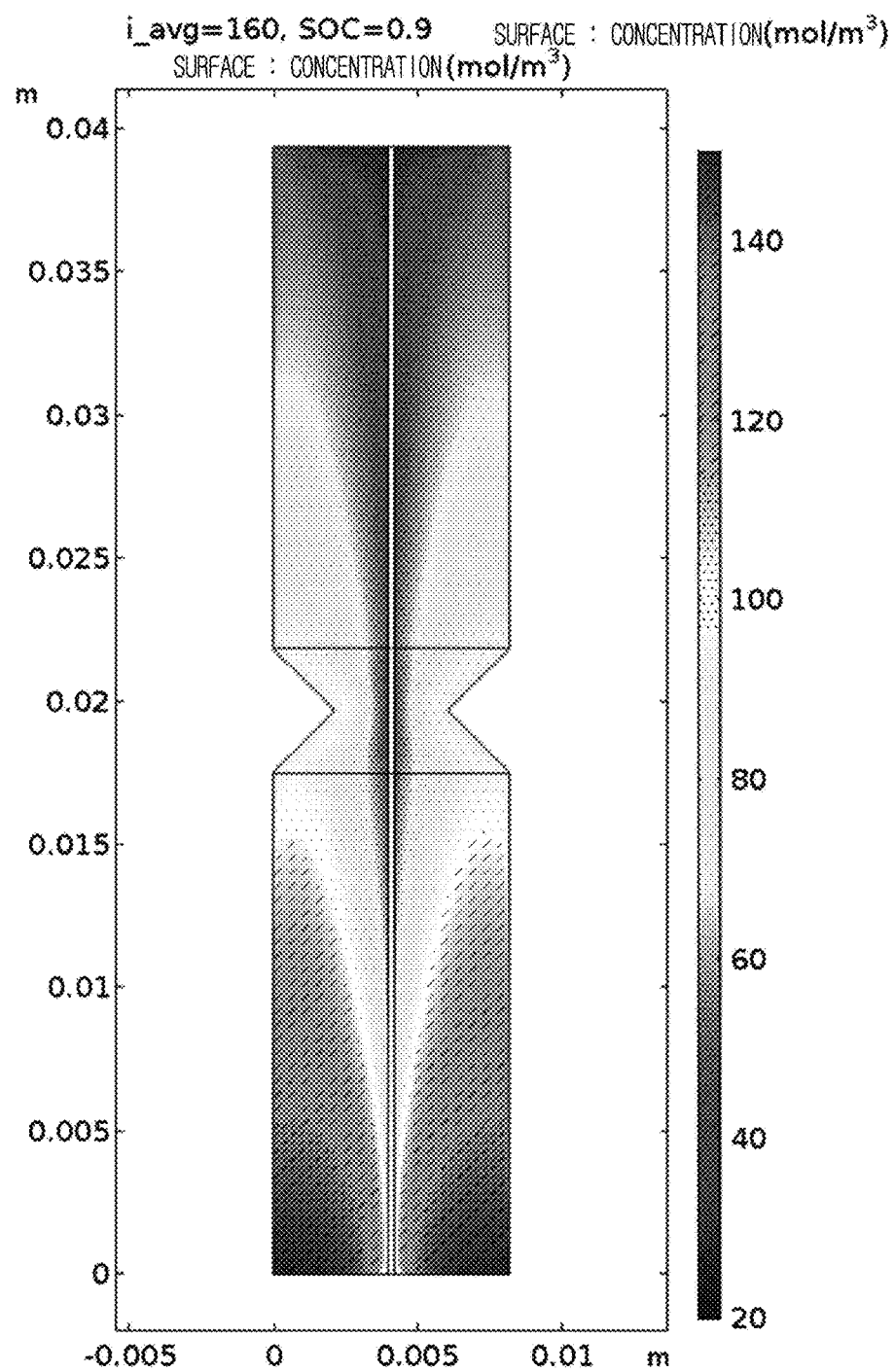

FIG. 5A illustrates a contour line of a concentration of vanadium in a normal porous electrode and FIG. 5B illustrates a contour line of a vanadium concentration in a porous electrode having a mixing plate or a mixing space formed in the middle of a channel. The uniformity of the concentration is increased regardless of the channel shape. The mixing is performed in the mixing space illustrated in FIG. 5C more than the mixing space illustrated in FIG. 5B and the mixing is performed in the mixing space illustrated in FIG. 5D more than the mixing space illustrated in FIG. 5C. The more the recessed depth of the mixing space, the more smooth the mixing phenomenon in the mixing space. Therefore, it is confirmed that the concentration uniformity is further ensured and the overvoltage is reduced.

FIGS. 6 and 7 illustrate a result of a simulation performed according to exemplary embodiments of the present disclosure.

For the quantitative analysis, a two-dimensional unit redox flow battery model was developed by applying an example of COMSOL Multiphysics package and characteristics of a normal redox flow battery cell and a battery having a mixing plate were compared therethrough. A numerical analysis model was calculated with respect to vanadium redox flow battery under the condition of 0.9 SOC (state of charge and 90% charging rate) at 160 mA/cm$^2$.

FIG. 6 illustrates a potential result obtained by comparing cell voltages at the time of charging. It may be confirmed that as compared with the normal unit battery, the potential of the mixing plate electrode having a mixing plate is low at the time of charging. In a low SOC region, the over-potential may be lowered just to approximately 0.2%, but, in a high SOC region, the over-potential may be lowered to approximately 3%. The current simulation is performed with respect to a battery having a high flow rate and a small size. However, when the flow rate is reduced and a thickness is increased, the effect may be more enhanced. By doing this, the over-potential is reduced so that the energy efficiency is improved and at the same charged amount, the potential is lowered to improve a capacitance. This may be confirmed through a concentration contour line of a reactant at the time of charging illustrated in FIG. 5B.

Figure 7A:
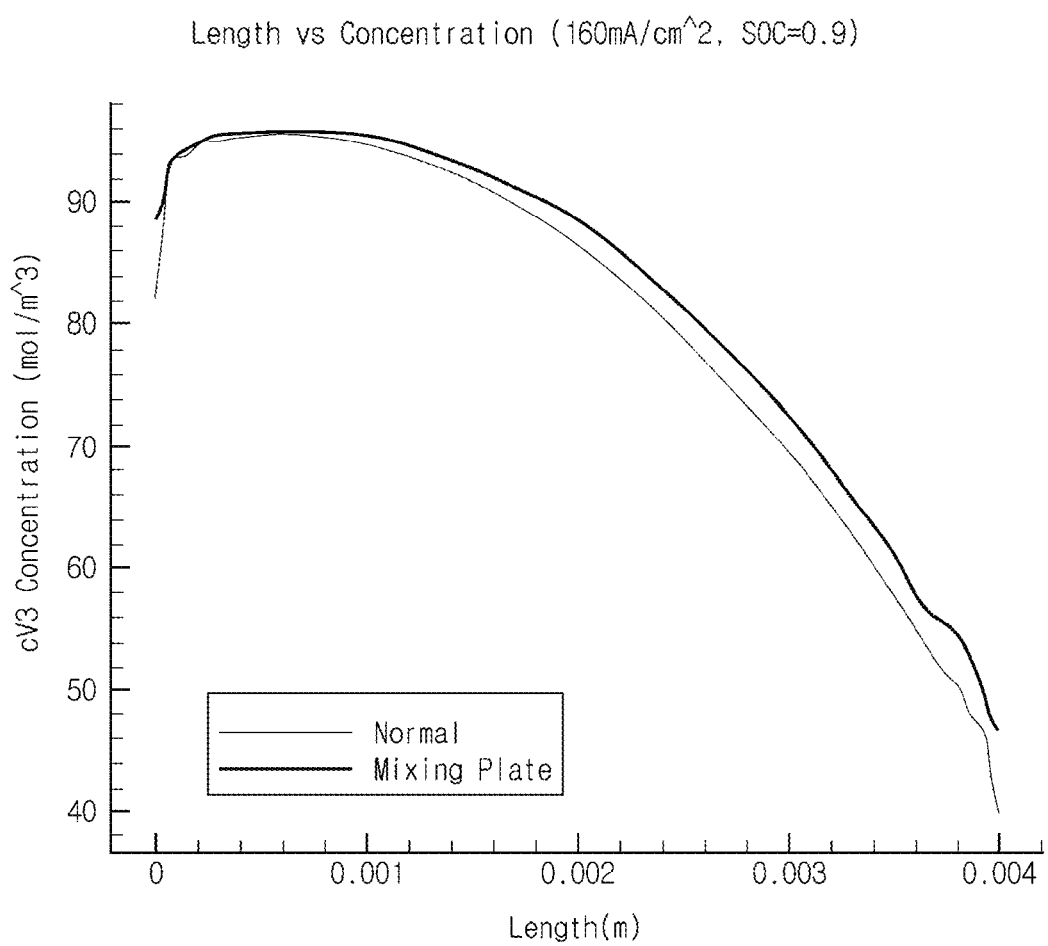

FIG. 7A illustrates a concentration distribution along an X-axis in an area which just passes through a mixing space of a porous electrode having a shape of FIG. 4D. Even though the closer to the ion exchange membrane, the lower the concentration, the concentration in the porous electrode having a mixing space is more uniform. The concentration uniformity may be confirmed even in a position which passes through the mixing space of the porous electrode and moves by a predetermined distance. When the mixing plate is provided, it is confirmed that the concentration uniformity is higher when it is closer to the end of the porous electrode.

Figure 7B:
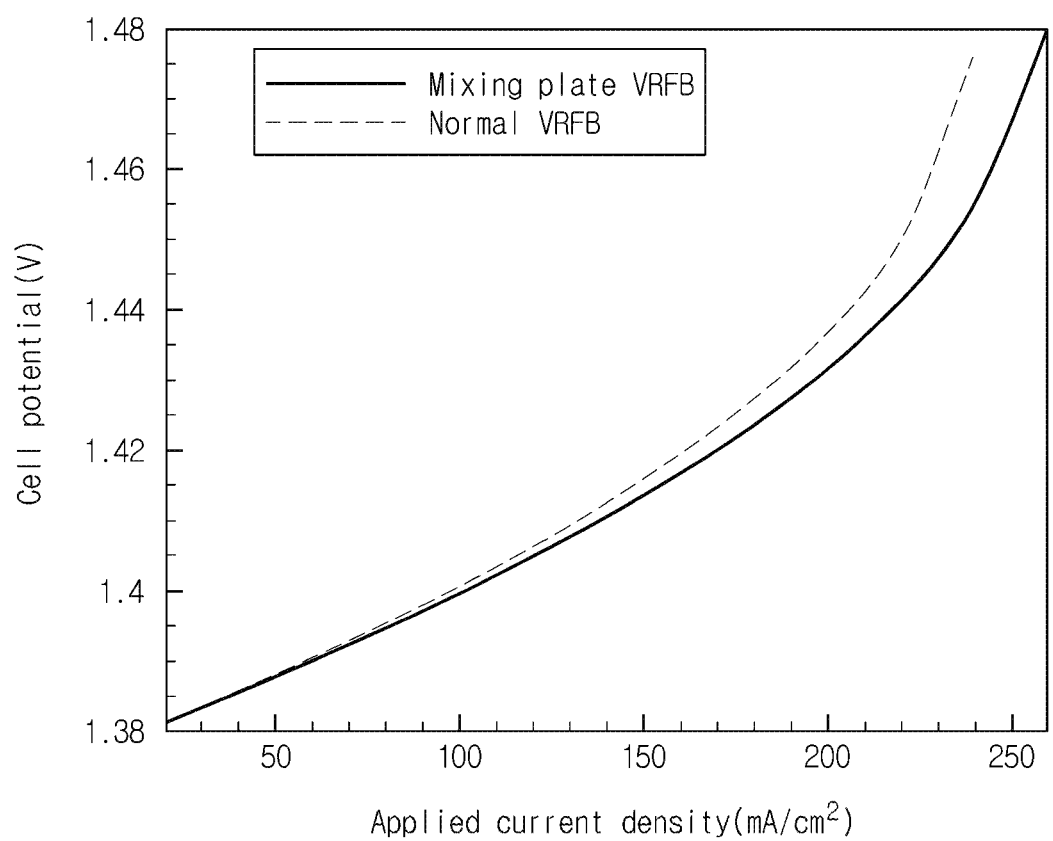
Figure 7C:
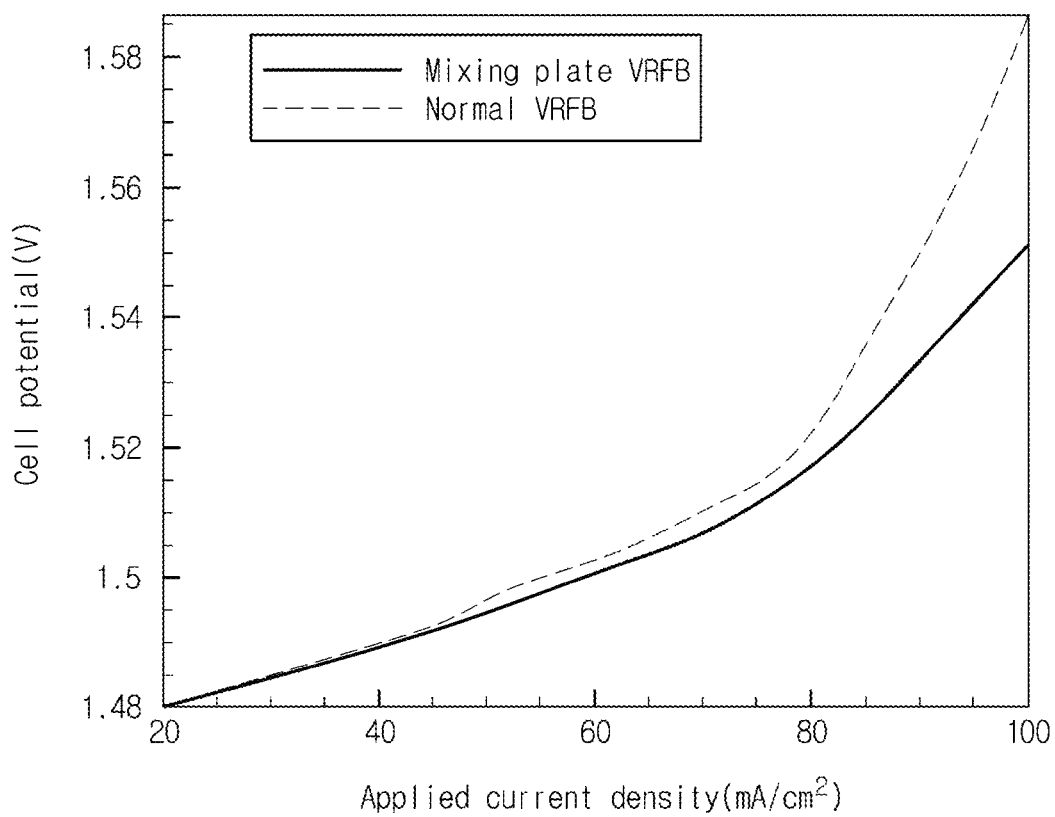

FIGS. 7B and 7C are results obtained by comparing cell voltages in accordance with an operating current condition. FIG. 7B is a result of a potential obtained by comparing a cell voltage in accordance with an operating current condition of 0.6 SOC and 3 ml/s of flow rate at the time of charging and FIG. 7B is a result of a potential obtained by comparing a cell voltage in accordance with an operating current condition of 0.9 SOC and 5 ml/s of flow rate at the time of charging.

Referring to FIG. 7B, it is confirmed that the larger the operating current condition, the larger the potential difference of a cell. In order to commercialize the redox flow battery, it is necessary to operate at a current density which is higher than a current density (40 to 160 mA/cm$^2$) of the related art. In the present exemplary embodiment, it is confirmed that the potential is lowered by 2% or more at the same SOC. This means that the energy efficiency is increased by 4% or higher (2% of the potential is reduced at the time of charging and 2% of potential is increased at the time of discharging) only by changing a structure under the same operating condition. The energy efficiency is represented by Equation 2.

$$\text{Stack energy efficiency } (EE) = \frac{\int p_d dt}{\int p_c dt} \quad \text{[Equation 2]}$$

$$= \frac{\int V_d i_d dt}{\int V_c i_c dt}$$

$V_d$ is a potential at the time of discharging, $i_d$ is a current at the time of discharging, $V_c$ is a potential at the time of charging, and $i_c$ is a current at the time of charging. For example, when 2% of the potential is reduced at the time of charging and 2% of the potential is increased at the time of discharging, it means that 102/98=104%.

It is understood that the difference is more significant at the high SOC more than the low SOC by FIG. 7C. Generally, when the current density is increased at the high SOC, the cell voltage is rapidly increased to reduce an available capacity of the battery. However, in the redox flow battery which introduces the mixing plate, the cell voltage is relatively moderately increased so that it is expected that the available capacity is higher than that of an existing potential.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A redox flow battery, comprising:
an ion exchange membrane; and
an electrode unit which includes a first flow electrode and a second flow electrode separated by the ion exchange membrane, and flows an electrolyte therein or thereout through the first flow electrode and the second flow electrode,
wherein an active material included in the electrolyte causes oxidation and reduction reactions and the electrode unit forms a mixing space which mixes the active material in a path through which the active material moves,
wherein the mixing space is an empty space formed when the first flow electrode and/or the second flow electrode are divided into plural and are disposed to be spaced apart from each other and is formed between the plurality of first flow electrodes and/or second flow electrodes.

2. The redox flow battery according to claim 1, wherein the first flow electrode and the second flow electrode are implemented by porous media and a first plurality of mixing spaces and a second plurality of mixing spaces are formed in the first flow electrode and the second flow electrode, respectively, to reduce a concentration deviation of the active material.

3. The redox flow battery according to claim 1, wherein the mixing space is implemented by a porous medium and a porosity or a permeability of the mixing space is higher than a porosity or a permeability of the first flow electrode and/or the second flow electrode.

4. The redox flow battery according to claim 1, wherein the mixing space is longitudinally installed in a direction perpendicular to a moving direction of the active material and a thickness and a width of the mixing space are smaller than or equal to a thickness and a width of the first flow electrode and the second flow electrode.

5. The redox flow battery according to claim 1, wherein the mixing space is longitudinally installed at a predetermined angle with respect to a moving direction of the active material and a thickness and a width of the mixing space are smaller than or equal to a thickness and a width of the first flow electrode and the second flow electrode.

6. The redox flow battery according to claim 1, wherein a width of the mixing space becomes narrower from the outside to the center.

7. The redox flow battery according to claim 1, wherein the electrode unit includes a wall protruding to a direction perpendicular to a moving direction of the active material and a side of the mixing space is recessed along a shape of the wall.

8. The redox flow battery according to claim 7, wherein a side of the mixing space is recessed to have a triangular shape, a triangular serrated shape, a trapezoidal shape, a semicircular shape, or a combination thereof.

9. The redox flow battery according to claim 7, wherein the more a recessed depth of the mixing space, the more mixing phenomenon in the mixing space.

10. The redox flow battery according to claim 1, wherein a positive electrode is located outside the first flow electrode and a negative electrode is located outside the second flow electrode, the battery further comprising:

two tanks which store a positive electrolyte flowing in the first flow electrode and a negative electrolyte flowing in the second flow electrode, respectively; and two pumps which circulate the positive electrolyte and the negative electrolyte, respectively.

11. The redox flow battery according to claim 1, wherein the mixing space is formed between an adjacent pair of the first flow electrodes, between an adjacent pair of the second flow electrodes, or both.

\* \* \* \* \*